(12) United States Patent
Sautner et al.

(10) Patent No.: US 6,168,040 B1
(45) Date of Patent: Jan. 2, 2001

(54) DOUBLE-WALL INSULATED CONTAINER

(75) Inventors: Karl Heinz Sautner, Angelbachtal; Jobst Kerspe, Bammental, both of (DE)

(73) Assignee: Isovac GmbH, Sinsheim (DE)

(*) Notice: Under 35 U.S.C. 154(b), the term of this patent shall be extended for 0 days.

(21) Appl. No.: 09/390,123

(22) Filed: Sep. 3, 1999

(30) Foreign Application Priority Data

Sep. 5, 1998 (DE) ............................................. 198 40 640

(51) Int. Cl.⁷ .................................................. B65D 23/02
(52) U.S. Cl. ............................... 220/592.1; 220/592.25; 220/592.27; 220/592.26; 220/62.15
(58) Field of Search ........................... 220/592.1, 592.25, 220/592.27, 592.26, 62.22, 62.15

(56) References Cited

U.S. PATENT DOCUMENTS

| | | | |
|---|---|---|---|
| 3,930,375 | * 1/1976 | Hofman | 220/592.27 |
| 4,052,347 | * 10/1977 | Dieterich et al. | 260/2.5 AK |
| 4,097,422 | * 6/1978 | Markusch | 260/2.5 AK |
| 4,142,030 | * 2/1979 | Dieterich et al. | 521/100 |
| 4,142,910 | * 3/1979 | Kraemer et al. | 106/86 |
| 4,444,821 | * 4/1984 | Young et al. | 220/592.27 |
| 4,674,674 | * 6/1987 | Patterson et al. | 220/592.27 |
| 4,729,853 | * 3/1988 | von Bonin | 252/6.1 |
| 5,678,725 | 10/1997 | Yamada et al. | 220/426 |

FOREIGN PATENT DOCUMENTS 3545518  1/1987  (DE).
718212   6/1996  (EP).

* cited by examiner

Primary Examiner—Joseph M. Moy
(74) Attorney, Agent, or Firm—F. Brice Faller

(57) ABSTRACT

A double-wall insulated container has an internal wall and an external wall enclosing an intermediate space which is under partial vacuum. A foam glass granulate fills the intermediate space and supports the walls. The walls may be metal or plastic and sealed with a vapor barrier as necessary to make the space leak-proof. The container may be styled as a Dewar flask for food or beverages, or larger to make it suitable for a household appliance such as a refrigerator.

7 Claims, 2 Drawing Sheets

DOUBLE-WALL INSULATED CONTAINER

BACKGROUND OF THE INVENTION

The invention relates to a double-wall insulating enclosure with a supported vacuum insulation between the walls.

Large area insulating enclosures for household appliances, e.g. refrigerators, freezers, and hot water tanks are usually made as double-wall enclosures with plastic foam insulation between the walls. In order to reduce energy consumption by these appliances, more efficient thermal insulation concepts are desirable. Future demands on efficiency of thermal insulation with practical insulation thickness can only be reached with evacuated insulations.

Proposed solutions are known where, e.g., the refrigerator housings are equipped with precast vacuum insulated panels—so-called vacuum-insulation panels (VIPs)—and the intermediate spaces are foamed out. The process involves a lot of different components, materials, and assembly steps, and therefore high manufacturing costs. Due to the high number of interstices, in areas where the VIPs border on each other there are areas with significantly higher thermal conduction and thus high energy loss.

Particularly for minimizing the high losses at marginal zones and interstices, it is known to fill the whole intermediate space of the double-wall enclosure with a supporting body (fiber board) and to evacuate the enclosure. For a vacuum leak proof enclosure and stability the walls are made of metal, especially stainless steel. However this makes enclosure manufacturing costly. Furthermore there are still high heat flows at big openings such as doors because of metallic heat bridges.

Insulated containers with double-wall glass inserts under vacuum for food and drinks (Dewar flasks) are also well known. The insulating effect is reached by hich vacuum (pressure less than 0.0001 bar) and is sufficient for keeping the food or drink warm (or cold) for many hours. However this kind of container is very fragile, and there are limitations with regard to design and size. The containers have to be supplied with a jacket, which makes the assembly costly. For circumventing the fragility, double-wall insulated containers can be fabricated completely of metal. These containers must also have a high vacuum in the insulating space, so the assembly is still costly. These containers are also limited with regard to design and size.

DE 35 45 518 discloses a so-called "supported vacuum insulation", which has an efficiency as high as the above mentioned glass Dewar flasks. They need a comparatively low vacuum (pressure less than 0.1 bar) to maintain the insulating effect and have high mechanical strength like the above mentioned metal Dewar flasks. Because of the self-supporting design, there is also considerable freedom with regard to design and size.

The use of preformed insulating bodies of fibrous material, e.g. fiberglass, requires relatively high production costs. In many cases, especially for insulated containers for drinks such as coffee or tea, it has been shown that in comparison with glass, the relatively rough internal surface of a metal container gets very dirty and is hard to clean. Insulated containers with thermal insulation of foamed plastic are a lightweight and cost-effective solution, but this kind of insulation does not keep food and drinks hot or cold for a long time.

In accordance with EP 0 718 212, an insulated container is equipped with a heat accumulator for keeping the temperature constant for a long period of time. The accumulator has to be large, because the containers are poorly insulated. The assembly is therefore voluminous and heavy, and the solution is not suitable for daily use.

U.S. Pat. No. 5,678,725 (=EP 0 733 330) discloses a thermally insulated double wall container which uses a gas having low thermal conductivity, e.g. inert gas, in the intermediate space. However the conductivity is still somewhat high for keeping food and drinks warm or cold.

SUMMARY OF THE INVENTION

The object of the invention is to provide an insulated double-wall container having good insulating properties, low weight, high mechanical stability, and easy assembly for cost effectiveness. This object is achieved by using a granulate of foamed glass in the intermediate space between the inner and outer walls. The granulate provides support for the walls when the space is evacuated, so that the insulation is integral and self-supporting, and the outer wall can itself provide the visible cover. The container walls can be made of metal, plastic, or a combination of materials. For easy clean-up and corrosion resistance, the internal container which comes into contact with food and drinks is preferably stainless steel.

To improve the internal surface of the container from a hygienic standpoint, it can be sealed with a hard glassy coating such as a sol-gel coating.

The insulating space is filled with a pourable, easily compacted foam-glass granulate with sufficient compression strength, and the space is evacuated to a pressure of less than 1 mbar. The container or enclosure may be sealed with a recessed plug in known fashion.

Tests have shown that optimum insulation conditions are reached with foam glass granulate with a grain diameter of 2 to 5 mm and a bulk weight of less than 0.2 g/cc. The foam glass has closed cells with an optimum cell size in the range from 80 to 150 um. Pulverized silica having a micro cell structure, in particular fumed silica, is also suitable.

To improve the leak proof aspect of the vacuum enclosure, especially with plastic jacket pieces, the surfaces of the enclosure are provided with a diffusion barrier coating prior to assembly. The coating is preferably provided on the surfaces facing the intermediate space. A sufficiently gas and vapor proof coating is preferably a multi-layer system which is first steam set with metal or metal oxide and then sealed with a glassy lacquer coat. It is also possible to apply a multilayer packaging sheet as diffusion barrier, for example by bonding when the wall elements are formed.

To maintain the vacuum over a long period of time, a getter material is provided in the insulating space. It is possible to use a formed getter body, or to admix getter into the granulate. Suitable getters for absorbing gas and vapor are oxides of barium, lithium, and calcium.

The foam glass granulate according to the invention offers the advantages that it can be poured, which simplifies assembly, and it fills the space and doesn't settle, so it provides support for the inner and outer walls of the container. The insulated double wall container according to the invention is suitable not only for small containers such as Dewar flask, but also for household appliances such as a refrigerator.

DESCRIPTION OF THE PREFERRED EMBODIMENTS

Figure 1:
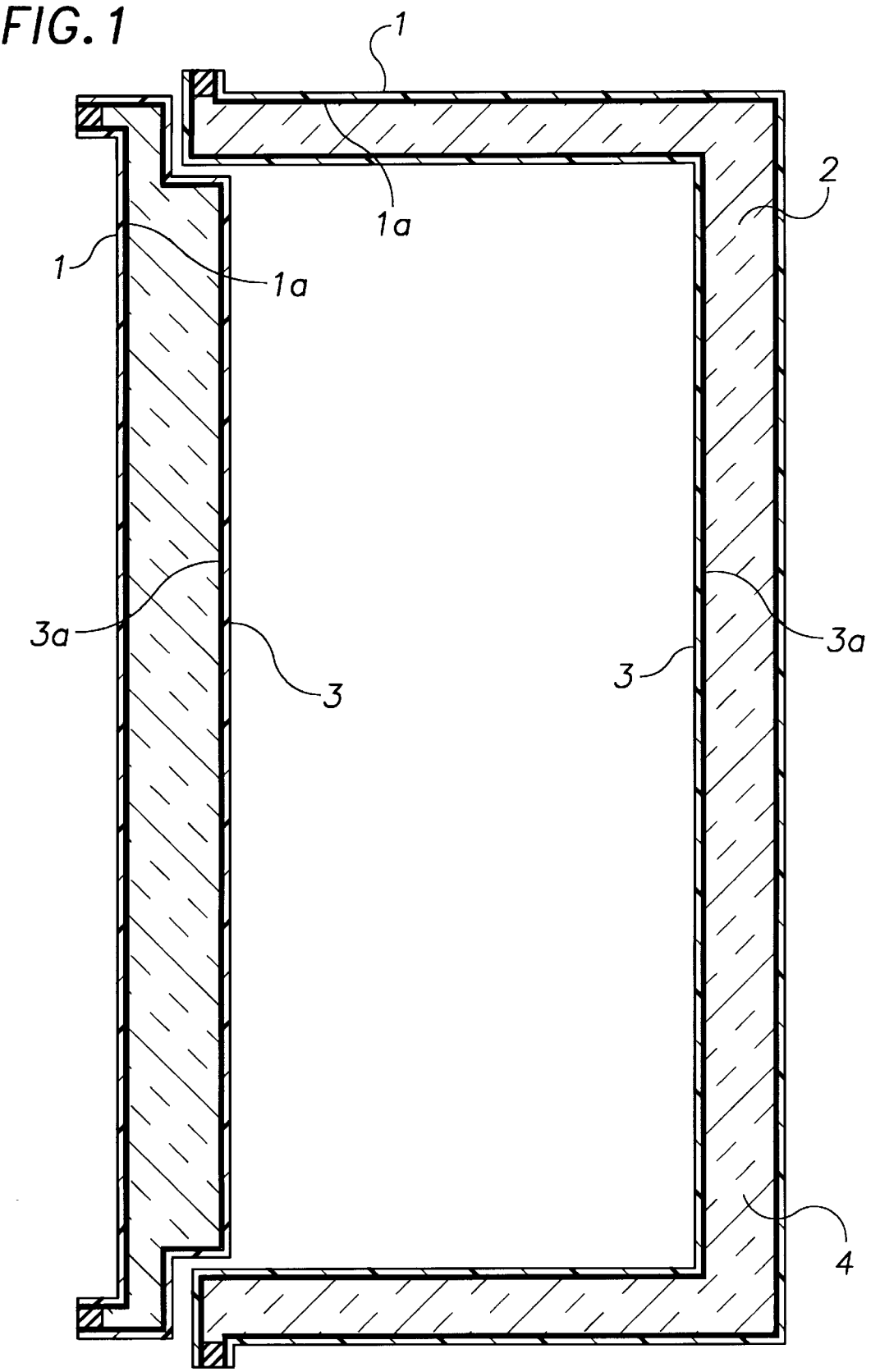
FIG. 1 is a schematic cross-section of a large enclosure having a door, such as a refrigerator.

Referring to FIG. 1, the outer wall 1 is made of plastic and has a coating 1a on the side facing the intermediate space. The internal wall 3 has a coating 3a facing the intermediate space. The coatings 1a and 3a serve as vapor barriers and can be made of metal oxide with an additional sealing such as lacquer, or can consist of a diffusion barrier sheet, which can be part of a multi-layer sheet. A further coating such as sol-gel (not shown) can be provided on the inside of the internal container for easy cleaning.

The intermediate space between the external wall 1 and the internal wall 3 is filled with a foam glass granulate 2 which supports the walls. This space is under partial vacuum, which is maintained by applying a getter 4 which absorbs gas and vapors.

Figure 2:
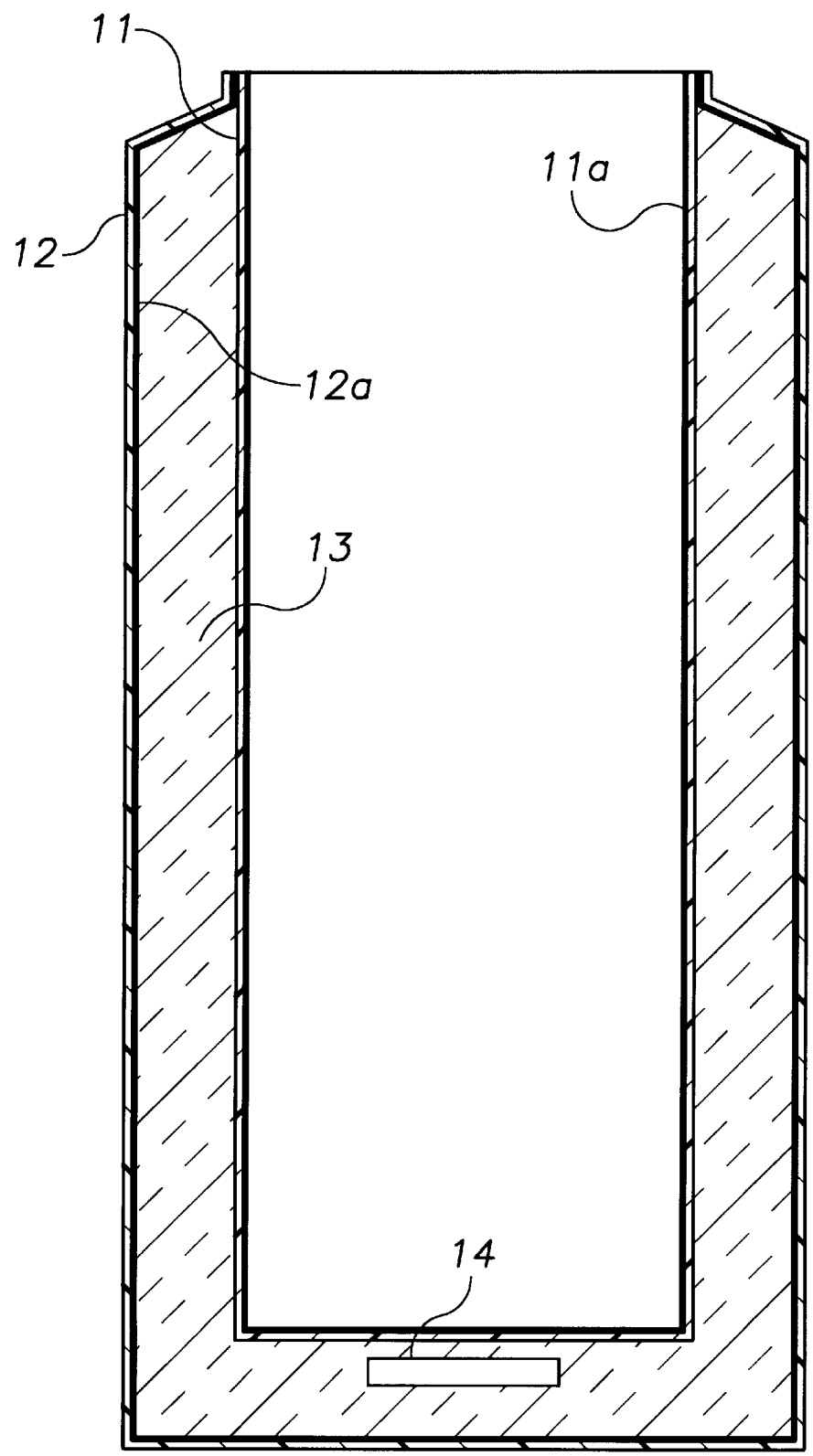
FIG. 2 is schematic cross-section of an insulated beverage container.

Referring to FIG. 2, a beverage container includes an internal container 11 having a coating 11a on the surface facing the container space, and an external container 12 of plastic having a vapor proof coating 12a on the surface facing the intermediate space. A support body of foam glass granulate 13 fills the intermediate space and supports the walls. This space is under partial vacuum, which is maintained with the help of a built-in getter 14.

The foregoing is exemplary and not intended to limit the scope of the claims which follow.

What is claimed is:

1. An insulated leak-proof enclosure comprising
   an internal wall and an external wall enclosing an intermediate space therebetween, which space is under partial vacuum, and
   a foam glass granulate filling said intermediate space and supporting said walls.

2. An insulated enclosure as in claim 1 wherein said foam glass granulate has a grain diameter of 2 to 5 mm and a density of less than 0.2 g/cc.

3. An insulated enclosure as in claim 1 wherein said granulate has a cell size of 80 to 150 microns.

4. An insulated container as in claim 1 wherein the internal wall has a suface facing a container space opposite from the intermediate space, said internal wall having a hard glassy coating on the surface facing the container space.

5. An insulated container as in claim 1 wherein at least one of said internal wall and said external wall is made of plastic, and said at least one plastic wall has a diffusion barrier coating facing the intermediate space.

6. An insulated container as in claim 1 wherein at least one of said internal wall and said external wall is made of plastic, and said at least one plastic wall has bonded thereto a diffusion barrier sheet facing the intermediate space.

7. An insulated container as in claim 1 further comprising a getter in the intermediate space with the foam glass granulate.

* * * * *